United States Patent [19]

Maasberg et al.

[11] 4,351,531

[45] Sep. 28, 1982

[54] SEALING ARRANGEMENT FOR A PISTON PUMP

[76] Inventors: Wolfgang Maasberg; Adalbert Huperz, both of Werthauser Str. 77-79, D-4100 Duisburg 14, Fed. Rep. of Germany

[21] Appl. No.: 187,576

[22] Filed: Sep. 15, 1980

[30] Foreign Application Priority Data

Sep. 15, 1979 [DE] Fed. Rep. of Germany ....... 2937459

[51] Int. Cl.³ .......................... F16J 15/40; F16J 15/48
[52] U.S. Cl. .......................................... 277/22; 277/3; 277/27; 277/59
[58] Field of Search .................. 277/3, 22, 27, 58, 59, 277/60, 61, 62, 77, 104; 92/165 R, 166, 168

[56] References Cited

U.S. PATENT DOCUMENTS

| | | | |
|---|---|---|---|
| 1,585,087 | 5/1926 | Deems | 277/60 X |
| 2,128,744 | 8/1938 | Hornschuck | 277/3 |
| 3,434,728 | 3/1969 | Soldato | 277/59 |
| 4,168,936 | 9/1979 | Scheller et al. | 277/27 X |
| 4,183,540 | 1/1980 | Hytonen | 277/27 |

FOREIGN PATENT DOCUMENTS

| | | | |
|---|---|---|---|
| 1425484 | 11/1968 | Fed. Rep. of Germany | 277/27 |
| 249415 | 3/1926 | United Kingdom | 277/59 |
| 576792 | 4/1946 | United Kingdom | 277/60 |

*Primary Examiner*—Robert S. Ward, Jr.
*Attorney, Agent, or Firm*—Williamson, Bains, Moore & Hansen

[57] ABSTRACT

A sealing arrangement for a reciprocating piston pump utilizing at least two sets of seals separately supported at spaced apart locations along the length of the pump cylinder. One of the sets of seals located rearwardly from the other with respect to the discharge end of the pump cylinder is enclosed within a chamber formed by a sleeve positioned around the pump plunger. This rearward set of seals is hydraulically pressurized radially inwardly by the aforesaid sleeve during the discharge stroke of the plunger, thereby creating a sealing clearance which is kept constant and providing an accurate and effective seal.

10 Claims, 1 Drawing Figure

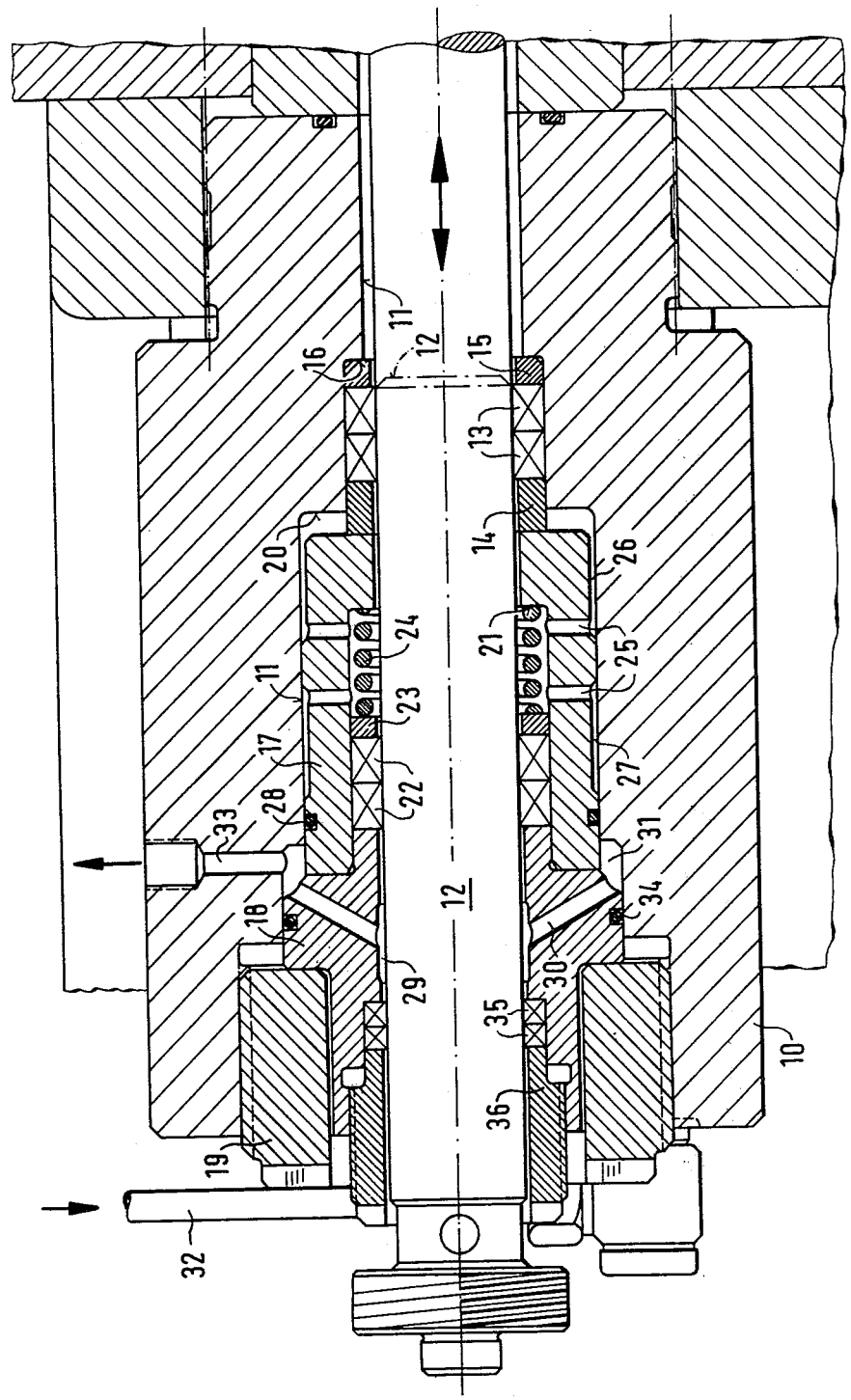

SEALING ARRANGEMENT FOR A PISTON PUMP

BACKGROUND OF THE INVENTION

The invention relates to a sealing arrangement for a piston pump, particularly a high or maximum pressure pump. As a means for sealing the clearance between a reciprocating plunger and cylinder, the improved seal arrangement is comprised of at least two sets of seals disposed one behind the other.

For packing the sealing clearance between plunger and cylinder in high or maximum pressure pumps relatively long seals are necessary. In this connection, and particularly as regards the portion of the seal which is situated furthest from the pressure medium, the danger of running dry arises, as in this area unsatisfactory lubrication conditions prevail. In principle, it is furthermore a problem to keep the sealing clearance constant, as the resilient cylinder expands on the delivery stroke of the plunger and contracts again on the suction stroke.

A solution as to how to keep the sealing clearance constant is described in the published West German Pat. No. P 28 46 172.5 according to which specially constructed floatingly mounted sealing sleeves are disposed one behind the other in the sealing clearance. However, this means that no seals as normally commercially available can be used.

BRIEF SUMMARY OF THE INVENTION

The object of the invention is to provide a sealing arrangement of the type first defined hereinabove in which the danger of running dry is practically eliminated while, nevertheless, commercially available seals are usable.

This object is achieved in that the sealing sets are supported separately from one another, and a sealing set provides a forward seal and one or more sealing sets provide a rearward seal along the length of the pump cylinder with respect to one end thereof. In each case the rearward seal is enclosed in a chamber formed by a sleeve and can be hydraulically tensioned radially by the sleeve during the compression stroke of the plunger, depending upon the specific liquid pressure during the compression stroke.

The sealing arrangement is therefore to be constructed at least in two stage fashion, each individual stage constituting an independent sealing unit with the first stage being used for forward sealing and the other stage for rearward sealing. As the individual seaing sets are supported independently of one another, the development of an undesirable high and harmful compression pressure on the rearward or end seal closest to the closed end of the pump cylinder is avoided.

The sealing set for the forward sealing which can be incorporated in conventional manner is lubricated as a consequence of the expansion and contraction of the cylinder during the stroke of the plunger by a hydrodynamic lubricating film which provides for adequate heat removal.

On the other hand the breathing movement of the cylinder has no effect on the rearward seal(s). Rather, as a result of the axial pretension of the rearward seal by the compression liquid a sealing clearance is created that is kept constant and thereby an accurate seal is produced. The hydraulic pretension is effected depending upon the specific pressure of the liquid, a proportional reduction of pressure being taken into account at each sealing step.

As a result of the aforesaid sealing arrangement, satisfactory sliding lubricating conditions, good heat removal, independent adjustment of the sealing clearance depending upon the pump pressure at the rearward seal or seals, minimum leakage, compensation for wear, satisfactory sealing against secondary air and maintenance-free long-duration operation are achieved. Furthermore a simple construction in terms of manufacturing and assembly as well as resistance to a diversity of feed media are obtained. Expensive grinding and polishing as required with the so-called "contactless seals" are no longer necessary.

Further advantages and embodiments of the invention will be noted from the following description and subsidiary claims, read in conjunction with the accompanying drawing.

BRIEF DESCRIPTION OF THE DRAWING

The single drawing FIGURE is a longitudinal section view of a pump cylinder unit for a piston pump incorporating a preferred embodiment for the sealing arrangement.

DESCRIPTION OF THE PREFERRED EMBODIMENT

The cylinder 10 represented has an inner sleeve 11 reducing in diameter stepwise in the direction towards the discharge end of the cylinder. This sleeve is intended to house a plunger 12 moved in reciprocating motion in the cylinder 10 by a drive which is not represented.

A first set of seals 13 are disposed between two rings 14, 15 separated from the plunger 12 by an annular clearance and are inserted into the inner sleeve 11. The ring 15 is situated forwardly in the direction of the discharge stroke of the plunger 12 towards the discharge end of the cylinder and is supported by a shoulder 16 on the inner sleeve 11.

The rear ring 14 with respect to the direction of the discharge stroke is supported on the front surface of a sleeve 17 which is disposed in the inner sleeve 11 and presses the sealing ring 13 forward against the shoulder 16. The sleeve 17 is tensioned axially by means of an insert 18 with the aid of a threaded nut 19 which is screwed into the inner sleeve 11. The inner sleeve 11 is widened adjacent to the ring 14 and has accordingly a shoulder 20 over which the ring 14 juts, so that an intermediate space is provided between the front side of the sleeve 17 and the shoulder 20.

The sleeve 17 has a chamber which is narrowed on its side facing the ring 14 by a shoulder 21. In this chamber a second set of seals 22 are arranged which are supported on the one hand by the insert 18 and on the other hand on the shoulder 21 by a ring 23 and a pretension spring 24. The ring 23 and the area of the sleeve 17 which extends from the shoulder 21 to the ring 14 are separated by an annular clearance from the plunger 12.

In the area in which the pretension spring 24 is housed, the sleeve 17 has two groups of through apertures 25 extending to the external circumference of the sleeve 17. The first group of through apertures 25 (e.g. two or four) is disposed in the vicinity of the shoulder 21 and opens out into an annular clearance 26 between the outer circumference of the sleeve 17 and the inner sleeve 11 of the cylinder 10. The annular clearance 26 is connected with the intermediate space between the front side of the sleeve 17 and the shoulder 20 of the inner sleeve 11.

The second group of through apertures 25 is disposed in the vicinity of the ring 23 and also opens out into an annular clearance 27 between the outer surface of the sleeve 17 and the inner sleeve 11. The annular clearance 27 extends axially in the opposite direction to the annular clearance 26 and at least partly over the area in which the sealing set 22 is disposed on the inner side of the sleeve 17. The two annular clearances 26, 27 are formed by means of correspondingly turned sleeve portions with reduced external diameter and separated by an annular area of the sleeve 17 with an outer diameter practically equal to the inner diameter of the inner sleeve 11.

On the side facing the insert 18, the sleeve 17 practically bears against the inner sleeve 11 and is provided with an externally-encompassing groove to receive an annular ring 28. Appropriately, the insert 18 has a tubular projection which is fitted into the sleeve 17 and is used for pressing on the set of seals 22.

Preferably, between the inner wall of the central opening of the insert 18 and the plunger 12 an annular chamber 29 is formed which is connected via ducts 30 with an annular channel 31 provided on the inner sleeve 11. Channel 31 in turn is connected with a cooling medium supply duct 32, by way of bores (not shown) connected with annual chamber 29, and to a passage 33 in the cylinder 10 for the removal of the cooling medium. Used for sealing off the cooling medium area are the annular seal 28, an annular seal 34 disposed in an annular groove of the insert and a further set of seals 35 on the plunger 12. Seals 35, as well as seals 22, are pressed against a shoulder of the insert 18 by a nut 36 screwed into the insert 18.

Sealing sets 13, 22, and 35 are usual packings, laminated seals, as generally described in published West German Patent Application No. P 29 13 229, or other sliding inserts as available commercially. Sealing set 13 is used for forward sealing in the direction towards the discharge end of the pump cylinder, and this is a conventionally incorporated sealing set. Seals 13 are exposed to the breathing movement of the cylinder 10. This arrangement therefore provides a forward seal which is not subjected to any excessive demands, for the radial breathing movement promotes the formation of a hydrodynamic lubricating film and provides for an adequate heat removal.

For the sealing set 22 which is used for rearward sealing, on the other hand, such a breathing movement is inhibited so as to supply an exact seal through a sealing clearance which is kept constant independently of the pressure of the fluid. As a result of the annular clearances 26, 27 which are provided, the sleeve 17 and thereby the sealing set 22 are pretensioned radially hydraulically along the discharge stroke of the plunger 12. This takes place depending upon the specific liquid pressure with a proportional reduction of pressure taking place at each sealing stage if several sets disposed one behind the other are used for the rearward seal. The pretensioning spring 24 affects the setting of the sealing set 22 before a hydraulic compression force is supplied.

In order that the maintaining of the clearance seal should not be disturbed as a result of the expansion of the cylinder 10 during the discharge stroke, the sleeve 17 is flushed and impinged upon on all sides by the pressure medium. By this means the result is achieved that the cylinder 10 expands relative to the internal pressure but the sleeve 17 floatingly associated with it remains unaffected.

Furthermore, as a result of the pretensioned volume of liquid which is situated between the sealing sets 13 and 22, the entry of secondary air during the suction stroke is prevented, and cavitation damage is thus prevented. Furthermore, an automatic compensation for wear is effected.

The cooling system provided guarantees a thorough removal of heat. The cooling water passes over the inner sleeve 11 direct onto the plunger surface and accomplishes the removal of heat from the rearward seals 22.

The hydraulic pretension of the sleeve 17 in the axial direction against the threaded nut 19 brings about a mainly static pretension of the latter. As a result protection against vibrations is provided and the danger of fatigue fracture of the threads of nut 19 is virtually eliminated.

What is claimed is:

1. In a high pressure piston pump, an improved sealing means in a clearance space between a cylinder and a plunger reciprocally movable therein comprising:
   a first set of high pressure seals positioned forwardly in the direction of the discharge stroke of the pump plunger towards the discharge end of the cylinder;
   a second set of high pressure seals separately supported at a spaced-apart location from said first set of seals, rearwardly along the length of the pump cylinder with respect to the discharge end thereof; and
   a sleeve around the pump plunger inside of the pump cylinder having a predetermined annual clearance space around its external circumferential surface, and said sleeve defining a chamber around the plunger within which said second set of seals are enclosed, and said sleeve being in fluid communication with the pressurized fluid medium being pumped on both its internal and external surfaces, whereby said sleeve and said second set of seals enclosed therein are hydraulically pressurized radially inwards during the discharge stroke of the pump plunger.

2. The pump sealing arrangement of claim 1 wherein: mechanical means are positioned and arranged to mechanically pretension said first set of seals axially for prior sealing before hydraulic compression forces develop.

3. The pump sealing arrangement of claim 1 or claim 2 wherein a pretension spring is positioned inside of said chamber of said sleeve in axial pressure-applying relation to said second set of seals.

4. The pump sealing arrangement of claim 1 wherein: said sleeve has an area with reduced diameter which extends at least partially along the outer circumferential surface thereof in substantial radial alignment with the portion of the inner circumferential surface of said sleeve within which said second set of seals are enclosed to at least partially form said annular clearance space.

5. The pump sealing arrangement of claim 1 or claim 4 wherein:
   an intermediate annular space is formed between a radially extending shoulder on the pump cylinder and the adjacent annular face on the forwardly disposed end of said sleeve with respect to the discharge end of said pump cylinder, whereby said sleeve can be pretensioned hydraulically on said forward annular face thereof.

6. The pump sealing arrangement of claim 5 wherein: said annular clearance space is comprised of two axially separated annular clearance areas of which one extends axially along the length of said pump cylinder as far as said forward annular face of said sleeve to communicate with said intermediate annular space.

7. The pump sealing arrangement of claim 2 wherein: said sleeve comprises at least a part of said mechanical means for axially pretensioning said first set of seals mechanically.

8. The pump sealing arrangement of claim 1 and further including:
passage means at least partially defined by said pump cylinder constructed and arranged to conduct a cooling fluid to cool said second set of seals.

9. The pump sealing arrangement of claim 8 wherein: said passage means comprise segments thereof arranged to impinge cooling fluid directly upon the surface of the pump plunger in the vicinity of said second set of seals.

10. The pump sealing arrangement of claim 9 wherein:
a ring-shaped insert is positioned around said plunger adjacent the rear end of said sleeve, said insert defining around the plunger an annular chamber through which cooling medium flows, and said insert acting as an abuttment for said sleeve at said rear end thereof; and
a nut threadedly engaged within the rear end of said pump cylinder opposite from said discharge end thereof, said nut bearing against said insert and holding it within said cylinder against said sleeve.

* * * * *